United States Patent
Kraus et al.

(10) Patent No.: US 8,184,572 B1
(45) Date of Patent: May 22, 2012

(54) REAL TIME CONTROL AND MANAGEMENT OF A TDMA RADIO

(75) Inventors: Wayne A. Kraus, Marion, IA (US);
Daniel M. Zange, Robins, IA (US);
Karl F. Hoech, Cedar Rapids, IA (US);
Robert J. Frank, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 877 days.

(21) Appl. No.: 12/002,902

(22) Filed: Dec. 19, 2007

(51) Int. Cl.
*H04B 7/212* (2006.01)

(52) U.S. Cl. ........................................ 370/322; 370/324

(58) Field of Classification Search .................. 370/321, 370/322, 324
See application file for complete search history.

(56) References Cited

U.S. PATENT DOCUMENTS

| | | | |
|---|---|---|---|
| 5,812,547 A * | 9/1998 | Benzimra et al. .............. | 370/350 |
| 6,678,282 B2 * | 1/2004 | Sharper et al. ................ | 370/442 |
| 7,630,339 B2 * | 12/2009 | Laroia et al. .................. | 370/330 |
| 7,839,824 B2 * | 11/2010 | Chakraborty et al. ........ | 370/330 |
| 2002/0167960 A1 * | 11/2002 | Garcia-Luna-Aceves .... | 370/442 |
| 2002/0170050 A1 * | 11/2002 | Fiorella et al. ................ | 717/168 |
| 2002/0172160 A1 * | 11/2002 | Moulsley ....................... | 370/252 |
| 2003/0214914 A1 * | 11/2003 | Cain .............................. | 370/252 |
| 2004/0098610 A1 * | 5/2004 | Hrastar ......................... | 713/200 |
| 2007/0008947 A1 * | 1/2007 | Belcea .......................... | 370/350 |
| 2007/0230421 A1 * | 10/2007 | Roadknight .................. | 370/338 |
| 2008/0089311 A1 * | 4/2008 | Roy et al. ...................... | 370/345 |
| 2008/0225841 A1 * | 9/2008 | Conway et al. ............... | 370/389 |
| 2008/0279204 A1 * | 11/2008 | Pratt et al. ..................... | 370/406 |
| 2009/0034489 A1 * | 2/2009 | Adams et al. ................. | 370/337 |

* cited by examiner

*Primary Examiner* — Jeffrey Pwu
*Assistant Examiner* — Scott M Sciacca
(74) *Attorney, Agent, or Firm* — Donna P. Suchy; Daniel M. Barbieri (57) ABSTRACT

A method is provided to control scheduling of transmission and reception by a TDMA radio. This method allows individual transmissions and receptions to be independently configured for different frequencies, coding rates, modulation schemes, in fact anything which the radio modem allows to be configured. In addition, this scheduling and configuration may be configured and reconfigured in real time without disrupting radio operations.

20 Claims, 10 Drawing Sheets

Block Diagram of a TDMA radio system having real time management and control
200

300
Flow Diagram of a process for real time management and control of a TDMA Radio

Event List For Radio B

REAL TIME CONTROL AND MANAGEMENT OF A TDMA RADIO

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract No. FA860-05-C7214 awarded by the U.S. Air Force Research Laboratory.

TECHNICAL FIELD

This description relates generally to TDMA radio operation and more specifically to control scheduling of transmission and reception by a TDMA radio in a coordinated multi-unit environment.

BACKGROUND

Radio networks may be set up to transmit video, audio, data signals and the like. Such radio networks may have demanding performance requirements depending upon the quality of service that may be required for and information being transferred through the network, as well as the frequency channel bandwidth available in which to transmit the radio signals.

In addition, software radios have been developed in which the radio itself may be configured by computer controlled software to transmit many different kinds of wave forms, and many different modulation characteristics. In addition, in a software defined radio, multiple kinds of signals such as voice data and the like, may also may be processed by the radio. However, in a software defined radio, processing resources may be needed to configure the radio to transmit in a given modulation format and handle a specific type of signal. In addition, synchronization of radio signal traffic in a network of TDMA radios may place additional demands on any processing circuitry and software available to the radio network.

Processing circuitry in a TDMA radio network may also be called upon to manage nodes or radios that enter and leave the network on a random basis. To operate efficiently, channel resources that were allocated to a radio that had exited the network may be reassigned to other radios. To ease demands on processing circuitry, it may be desired to provide new ways to manage and control the radio systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide a way to control and manage a TDMA radio transmissions and reception. In particular this may be achieved without fixed time slots. Transmission and reception events can be scheduled at any time subject only to the resolution of the time base utilized Transmission parameters can be set locally in the modem by indirection, an the event table provides a set of predefined (already downloaded) events from which to choose. Typically all the information required to configure the modem for a particular frequency channel, data rate, modulation, etc. can be defined in the event definition in the event table. Also defining a repeating epoch with an iterative event list which schedules transmission and reception events may be provided. Both the event definitions and the event list can be downloaded either before operation starts or, using the inactive event list, in the background during normal operation. Management and control may achieved by providing a parallel autonomous system in which setup and configuration of a radio and its channels may be performed. Then, at an agreed upon time, the profiles and set-up data are then executed. To allow for changes, dynamic configuration may be provided through use of an active event list and an inactive event list which may be switched in and out of use while one or the other is configured. In addition to scheduling and coordinating transmission, according to a common time-base, error handling is also provided for.

The present example provides for each node a radio designed in two basic units, a programmable RF modem which transmits and receives streams of data, and a computer which controls this modem and provides the data interface to multiple applications. This computer could be a general purpose computer ("GPC") running a standard operating system, or it could be a more specialized device such as a DSP. For convenience this device will be referred to as the general purpose processor ('GPP"). The GPP configures and controls the modem, and connects the modem's data streams with user applications.

Configuration of the radio typically needs to be performed in situations where transmissions and receptions occur rapidly with respect to the capability of the GPP to manage them and communicate configuration changes amongst the radios operating in the network. A parallel autonomous systems in which most of the work is performed during set up and configuration, and then at an agreed time everything is set in motion may be advantageous. The modem is controlled by a repeating event list which is essentially a program of radio transmissions and which operates in synchronization with a set of chained DMA structures in the GPP.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. A conventional Time Division Multiple Access ("TDMA") radio system may share a single radio channel by assigning its constituent nodes specific times when they may transmit. Since no two radios are scheduled to transmit at the same time they may share the channel without interference. The scheduling is usually done by defining a period which may be divided into a fixed number of time slots and assigning the constituent nodes specific time slots in which they may transmit. Such conventional radios as currently implemented may have the characteristics of fixed timing and fixed frequency channel characteristics. In fixed timing the period is fixed, and divided into fixed length equal time slots. In fixed frequency channel characteristics transmission characteristics such as frequency channel, modulation, etc. are typically the same for all time slots.

Figure 1:
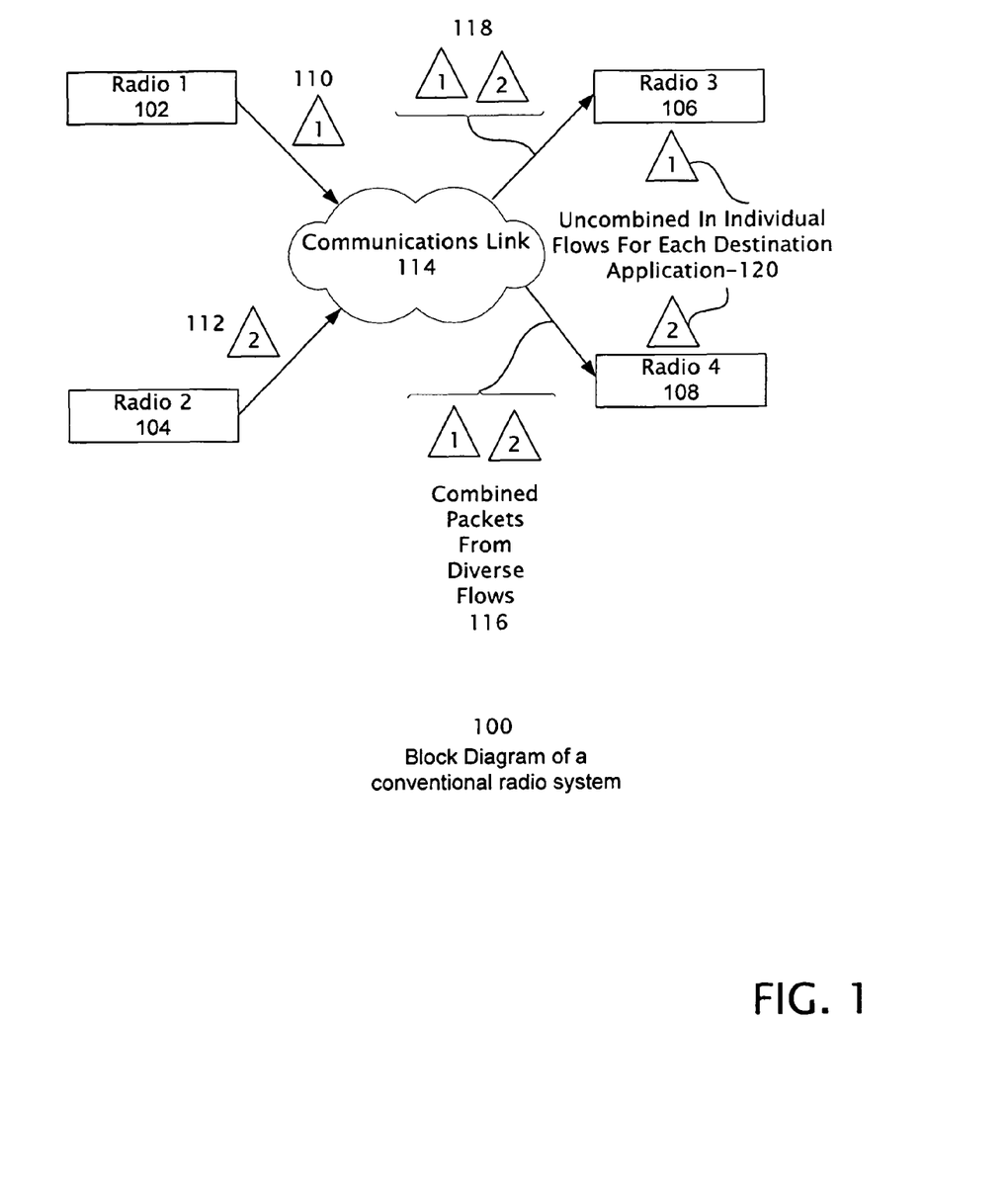
FIG. 1 is a block diagram of a conventional TDMA radio system.

FIG. 1 is a block diagram of a conventional radio system in which the radios share a single radio channel. A TDMA radio system such as the exemplary Quint Networking Technology ("QNT") radio system may be designed to provide direct digital wireless communications among a plurality of nodes. Communication in such a network typically communicates data such as telemetry information. In a military application, these nodes might be aircraft, unmanned combat air vehicles, weapons, tactical unmanned air vehicles and dismounted ground forces having a small, robust, multiband, multifrequency software defined radio communication. The objective can be to configure dismounted ground forces as nodes in network centric operations, able to communicate digitally with the other nodes and able, for example, to take control of weapons after launch. Alternatively, other types of communication systems can be utilized as a TDMA radio system.

In a conventional TDMA radio system 100, one or more radios 102, 104, 106, 108 are typically coupled via a communication link 114. Such radios typically share the communications link 114 such that a packet of information 110 from radio 102 being transmitted must share the link with a packet 112 transmitted from radio 104. In sharing the communication link 114, the packets are typically combined, by scheduling packets into time slots, to form diverse flows 116, 118 as they reach receiving radios 106, 108 where they may be separated back into individual flows. These diverse flows can include different types of packets and transmissions combined so that they may share communications link 114. Receiving radios 106, 108 receive diverse packet flows 116, 118 that are uncombined into individual flows 120 for each destination application in their respective radios 108, 106.

For a conventional QNT network using TDMA radio technology, it is typically necessary to combine packets from multiple flows between multiple applications into a repeating pattern for transmission. The individual packet transmissions and receptions must be independently configurable, and it should also be possible to reconfigure the radio dynamically in real time without interrupting data transmission. These packets may be transmitted at a high rate. Such a network of radios transmitting data may present challenges to hardware designers seeking to achieve desired performance. For example, having to reconfigure socket radios and transmission patterns while allowing for the addition or subtraction of radio nodes may put burdens on processing hardware and software that could impair performance. Alternative ways of controlling such a radio system may allow for improved performance. The examples below provide for real time control and management of a TDMA radio system typically having multiple nodes.

The examples below describe a network of three nodes, communicating through three radios in which a method of real time control and management of a TDMA radio have been implemented. Although the present examples are described and illustrated herein as being implemented in a portion of a QNT system, the system described is provided as an example and not a limitation. As those skilled in the art will appreciate, the present examples are suitable for application in a variety of different networks.

There are several developments in communications system design that may advantageously utilize a method for real time control and management of a TDMA radio as will be described below. Modern programmable modems can include capabilities that may go beyond the constraints of fixed transmission time periods and fixed channel characteristic constraints. Programmable modems can switch channels, frequency bands, modulation characteristics, etc. at high speed, and in fact can do so within the same time period. To make use of these programmable modem characteristics it may be advantageous to vary transmission time periods and to allow channel characteristics to change in the method for real time control and management of a TDMA radio.

In an alternative method for real time control and management of a TDMA radio it can be possible to specify a time and all the other characteristics of a transmission along with each data packet. However, the amount of data that can required to specify all of this may greatly exceed the actual data payload to be transmitted. Given these parameters for the packets the method for real time control and management of a TDMA radio described below may be a more efficient and useful way of utilizing the capabilities of a conventional programmable modem in a TDMA radio system.

Performance innovations in method for real time control and management of a TDMA radio may include:

No fixed time slots—events (such as transmissions and receptions) can be scheduled at any time subject only to the resolution of the time base All transmission parameters are set locally in the modem by indirection—the event table provides a set of predefined (already downloaded) events from which to choose. All the information to configure the modem for a particular frequency channel, data rate, modulation, etc. is defined in the event definition in the event table.

Further reduction in set up time can be achieved by defining a repeating epoch with an iterative event list which schedules these events.

Both the event definitions and the event list are downloaded either before operation starts or, using the inactive event list, in the background during normal operation.

The examples presented below of a method for real time control and management of a TDMA radio may advantageously implement these performance characteristics.

Figure 2:
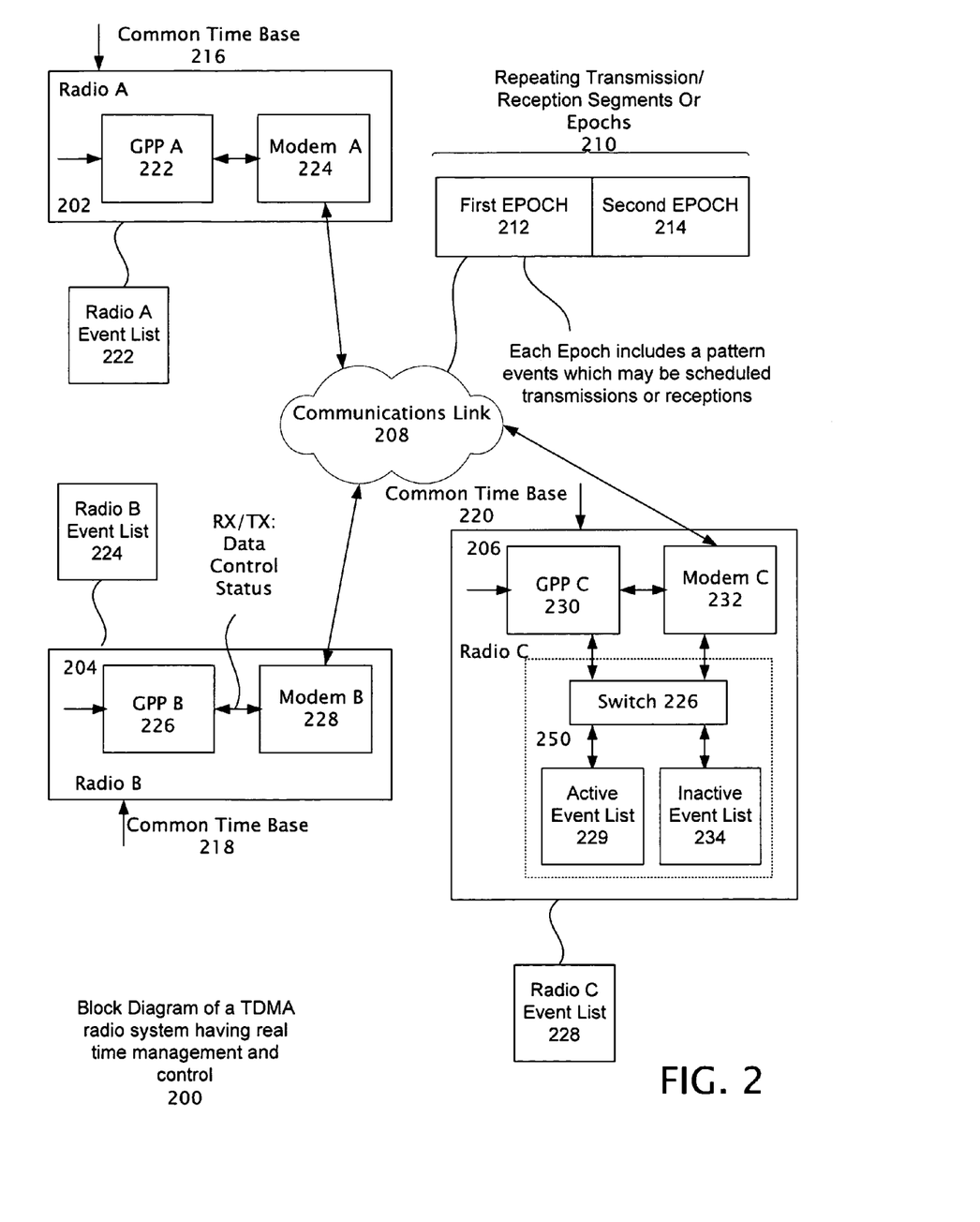
FIG. 2 is a block diagram of a TDMA radio system having real time management and control.

FIG. 2 is a block diagram of a TDMA radio system having real time management and control. An exemplary three-node network implements the method of the current example. Each node includes a radio, made up of a conventional programmable modem ("modem") and a computer. The computer configures and controls the modem, and connects the modem's data streams with the node's applications. The remainder of the discussion below details the operation and coordination of the radio and its modem.

In a TDMA radio system having real time management control 200, three exemplary radios 202, 204, 206 are shown sharing a communications link 208. The three nodes of radios are exemplary only, and more or fewer radios may be joined together in such an exemplary radio system.

Instead in sharing the communications link 208, advantage in taken of the fact that transmission patterns 212, 214 of these coupled radios may be repetitive. For example, repeating transmission and or reception segments or epochs 210 may be formed. Here, a first epoch 212 may be followed by a second epoch 214 and any number of successive epochs may follow that are the same. Each epoch 212, 214 includes a pattern of events (not shown) which may include scheduled transmissions or receptions from one or more of the radios 202, 204, 206 included in the network.

The events which make up each epoch 212, 214 may include regularly scheduled transmissions or receptions from any or all the radios. In order to facilitate scheduling of receptions and transmission, each of the radios 202, 204, 206 may be provided with an event list 222, 224, 228 respectively. Radio A event list 222 directs the transmissions and receptions of radio A 202. Radio B event list 224 coordinates the scheduling of transmissions and receptions from radio B 204, and the event list for radio C 228 controls receptions and transmissions in radio C 206.

In utilizing the event list, a computer processor DSP or the like may be utilized to program a modem 224, 228, 232 disposed in each radio. Radio A 202 includes a GPP A 222 coupled to modem A 224. Radio B includes the GPP B 226 coupled to a modem B 228 and radio C may include a GPP C 230 coupled to a modem C 232.

Radio C 206 includes an exemplary dynamic reconfiguration 250 for event list 228. Dynamic reconfiguration may be included in one or more of the radio that make up the TDMA network having real time management and control. In the exemplary dynamic configuration, a switch 226 is coupled to the GPP C 230 and modem C 232. The switch 226 can also be coupled to an active event list 229 and an inactive event list 234 that makes up the radio C event list 228. The system may alternate between the active and inactive events lists to modify the inactive event list while the other is being used, and then swap lists to make the changes take effect.

So that each radio may coordinate the use of their event list, a common time base can be provided to each radio 216, 218, 220. Common time base 216 is applied to radio A 202, the common time base 218 is applied to radio B 204 and the common time base 220 may be applied to radio C 206. The time base may originate from any conventionally constructed time base suitable for application in a TDMA radio system. The time base coordinates when transmissions may occur in each epoch.

Figure 3:
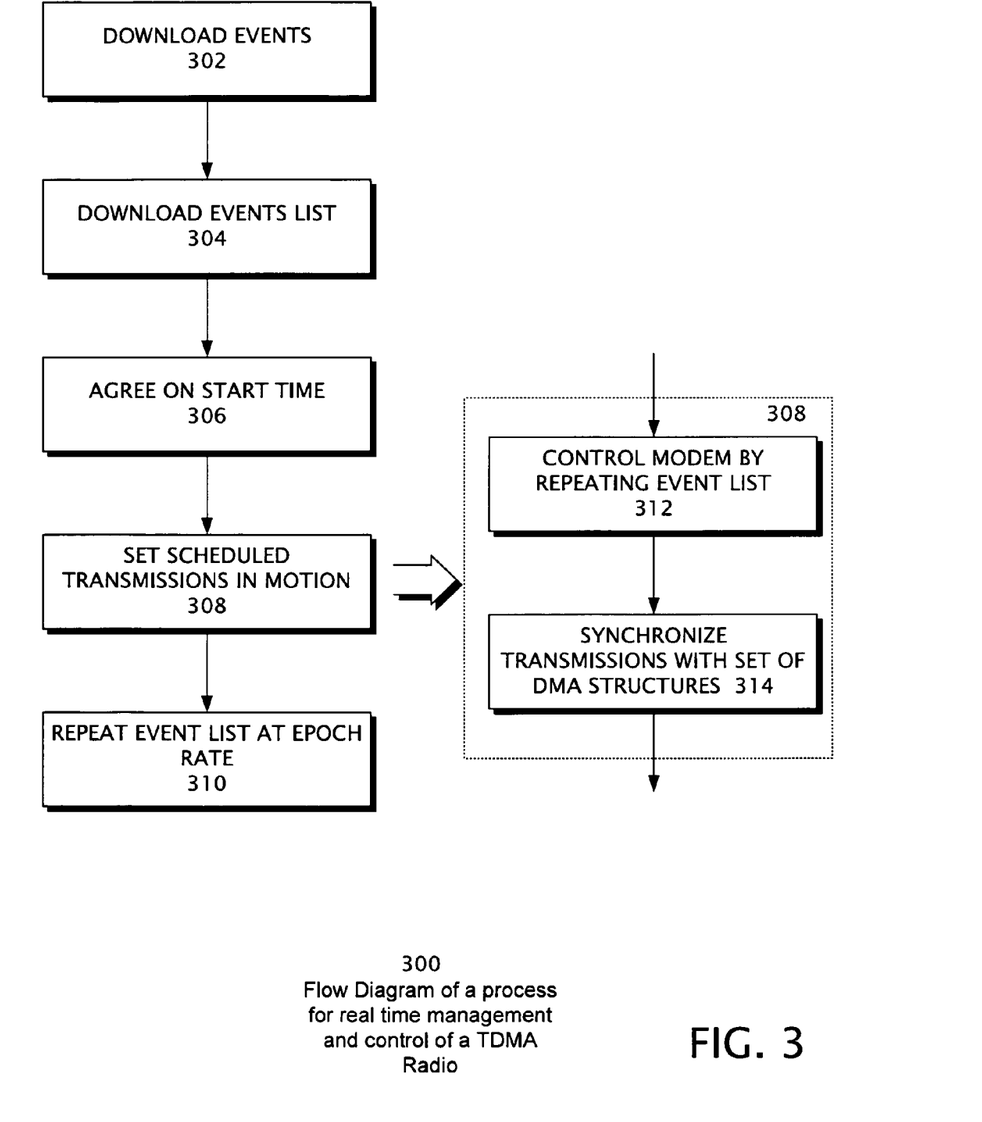
FIG. 3 is a flow diagram of a process for real time management and control of a TDMA radio.

FIG. 3 shows a process for real time management control of a TDMA radio system. To control such a radio system, a parallel autonomous system in which most of the work is performed during set up and configuration is built. At an agreed time, everything is typically set in motion for operation of the radio. The modem may be controlled by a repeating event list which is essentially a program of radio transmissions and receptions which may operate in synchronization with a set of chained DMA structures in the GPP.

First, the event definitions are downloaded 302 next the events list is downloaded to the radio 304. Then, a common time base is agreed upon or selected 306. Then, at a set or scheduled time, radio transmissions are set in motion 308. An event list is repeated controlling transmission of the radios at an epoch rate 310.

In setting scheduled transmissions in motion 308, sub-processes may be provided. First, control of a modem may be provided by a repeating event list 312. Then, transmissions may be synchronized with a set of DMA structures 314.

A data flow is defined as a stream of data from one source radio to one or more destination radios. In operation multiple users of a radio network will be exchanging streams of data. The radio transmits and receives these streams as discrete packets. These transmissions and receptions take place in a repeating pattern which is called an epoch.

Figure 4:
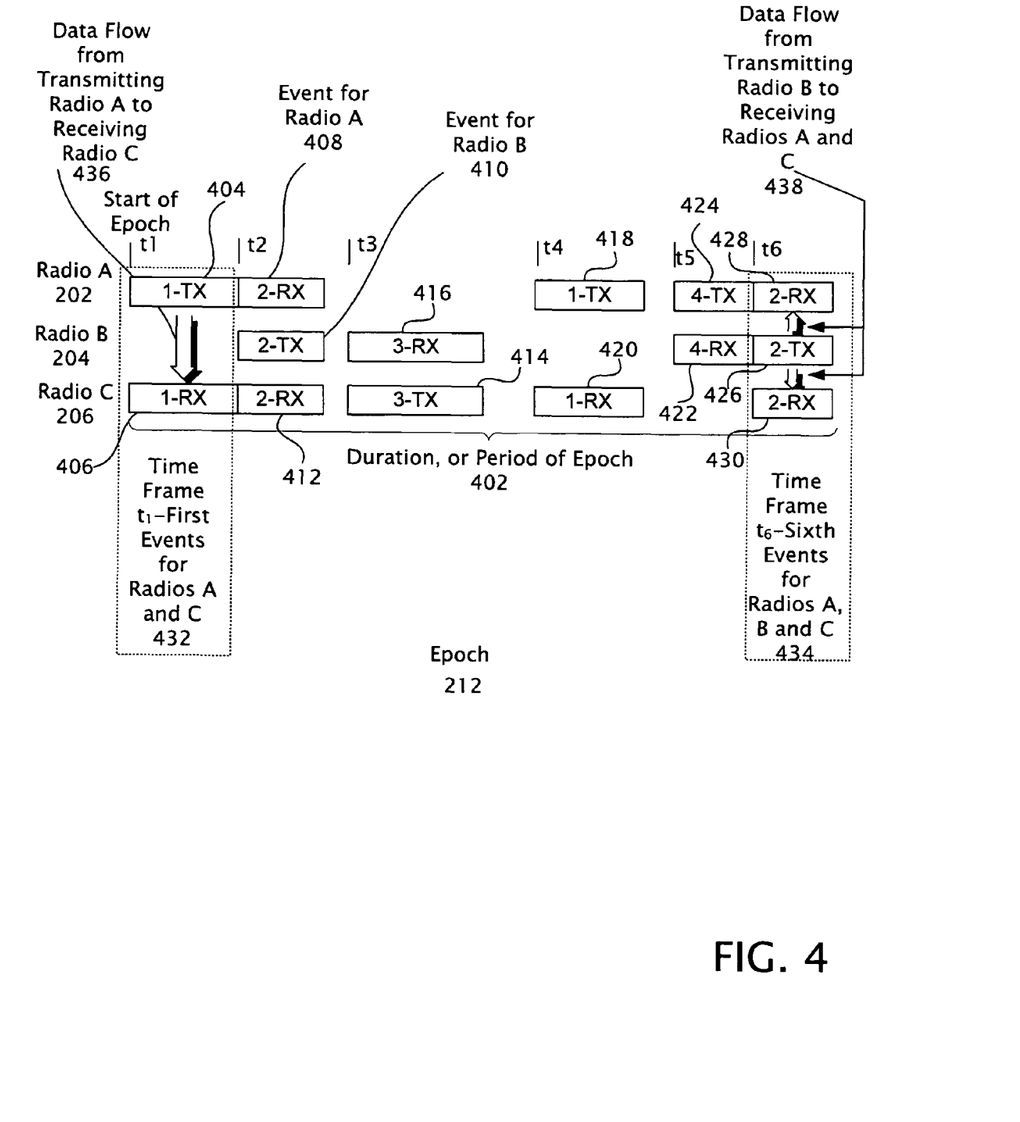
FIG. 4 illustrates a sequence of events, or epoch, in which data flows are communicated between three exemplary radios.

FIG. 4 illustrates a typical epoch 212 in which data flows are being communicated through the network. The epoch 212 may be divided into various time segments t1, t2, t3, t4, t5, t6 for each of the three radios 202, 204, 206 that are part of the network. During each time interval, t1, t2, t3, t4, t5, t6 one radio may be transmitting with one or more radios receiving. For example, as shown in time period t1 432, data in transmitting or flowing 436 from radio A 202 to radio C 206. As a further example, during time period t6 434, radio B 204 is transmitting and radios A 202 & C 206 are receiving the data flow 438.

Each reception or transmission during each time period may be called an event. For example, during period t2 the reception pattern or configuration 408 for radio A may be termed event and may be also labeled as 2-RX. For radio B, a transmission during time period t2 may also be defined as event 410 or 2-TX. As can be seen, there are multiple or a plurality of events 404, 406, 408, 410, 412, 416, 414, 418, 420, 422, 424, 426, 428 and 430 that may be defined in a given epoch.

During timeframe t1, it can be seen that radio A is providing a transmission event 404 and radio C is receiving the transmission from radio A. All of which is occurs in the first time period 432. In the sixth time period t6, 434 radio B is transmitting in the transmission event 426 and radios A and radios C are receiving as configured by reception events 428 and 430 respectively.

These radios operate in time synchronization, and each radio is transmitting or receiving the flows in which it participates at certain scheduled times. Each transmission or reception of a packet or packets may be called an event. Each repeating epoch is thus made up of a sequence of a plurality of events.

Note that these events are not the same as conventional TDMA time slots. These events are configured and scheduled independently of one another. Each event may be characterized by its own frequency channel, modulation, coding rate, etc. In fact, the only limit to the variation of these events is the capability of the modem. These events also are not constrained to lie on predefined boundaries but may be scheduled at any time, again only limited by the capability of the modem.

Each epoch consists of a sequence of events, but not all radios participate in all flows. Each radio is only cognizant of the flows in which it participates. Thus each radio has its own view of the sequence of events which make up an epoch. The particular sequence of events which constitutes the epoch for a given radio makes up that radio's event list. The event list for each radio is downloaded as part of the radio configuration, and may be modified while the radio is in operation. The event list contains a list of the events in which the radio participates, with their scheduled times relative to the start of the epoch. Each event list also has an associated epoch duration, which is the same for all participating radios and is also a configurable parameter.

The events themselves are downloaded during radio configuration, and can also be modified or augmented while the radio is in operation. The events are defined in a separate event table, and contain all the information required to transmit or receive the data, such as data size, modulation, coding rate, etc.

Figure 5:
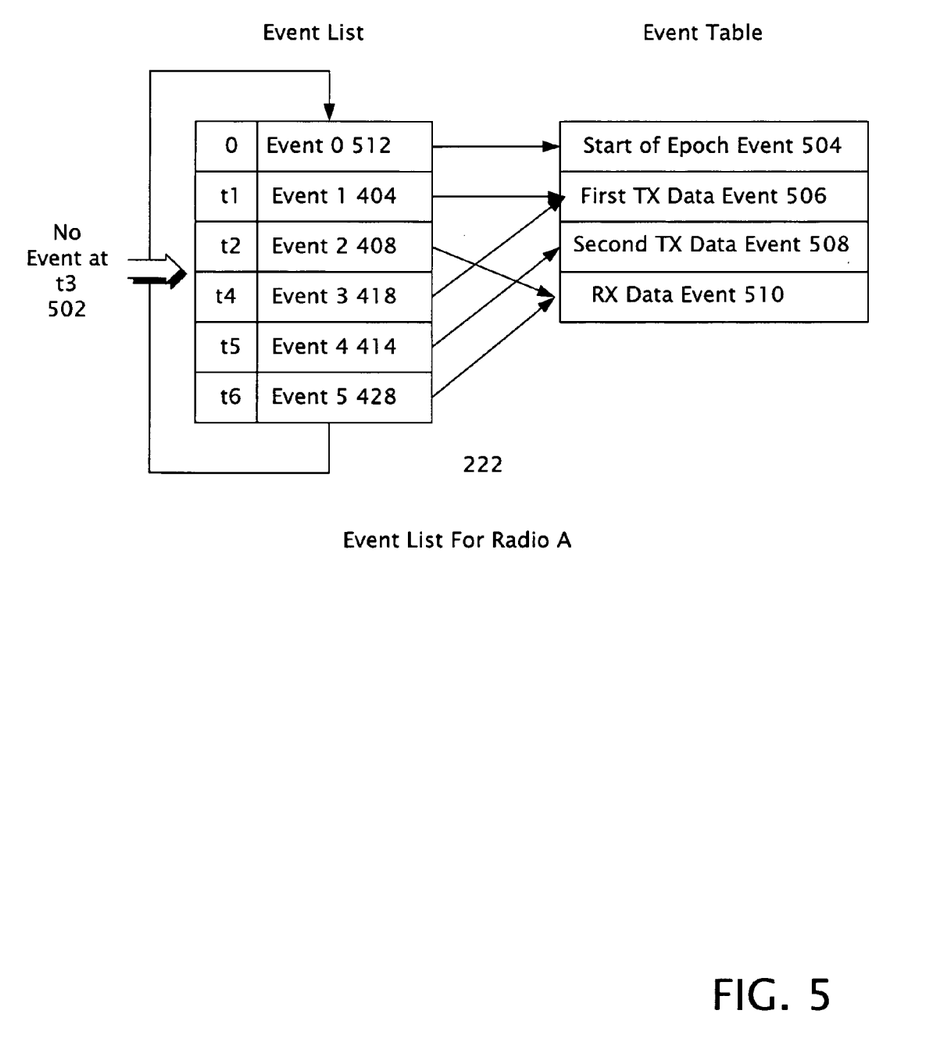
FIG. 5 illustrates the event list for a first radio in the exemplary network.
Figure 6:
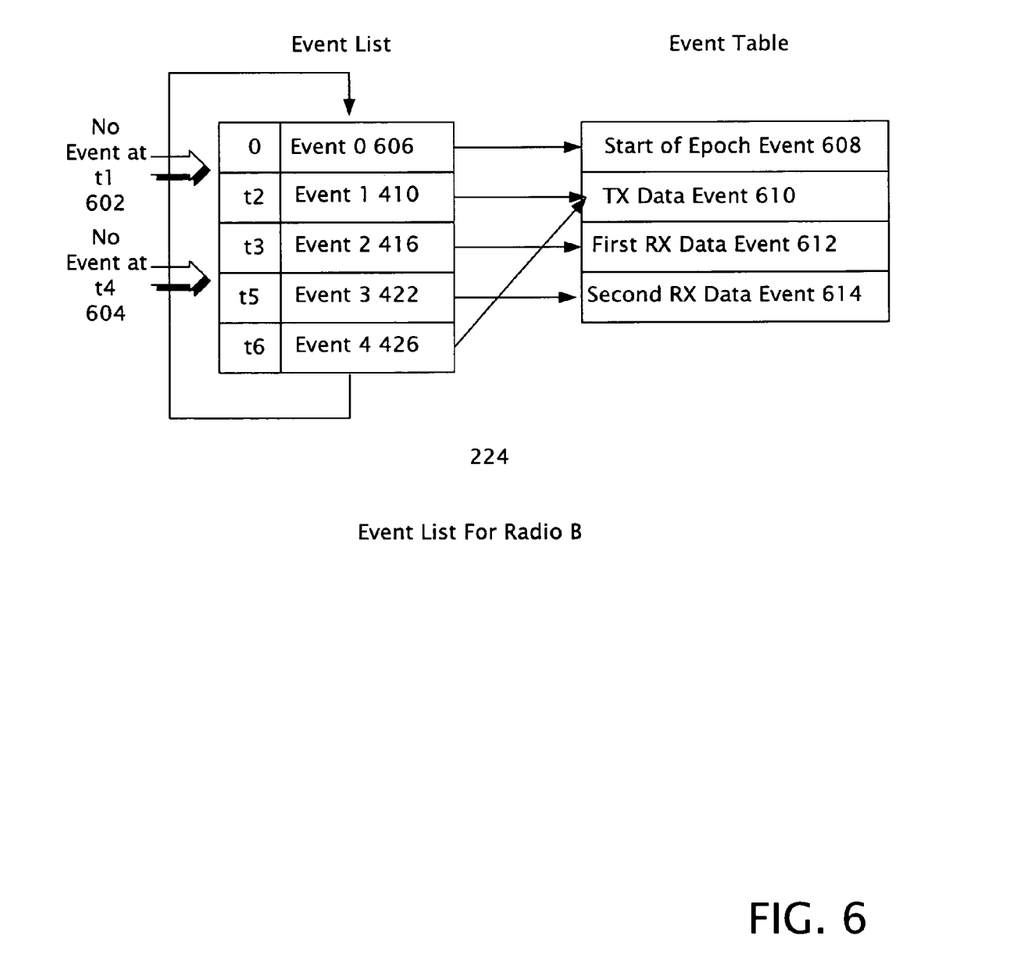
FIG. 6 illustrates the event list for a second radio in the exemplary network.
Figure 7:
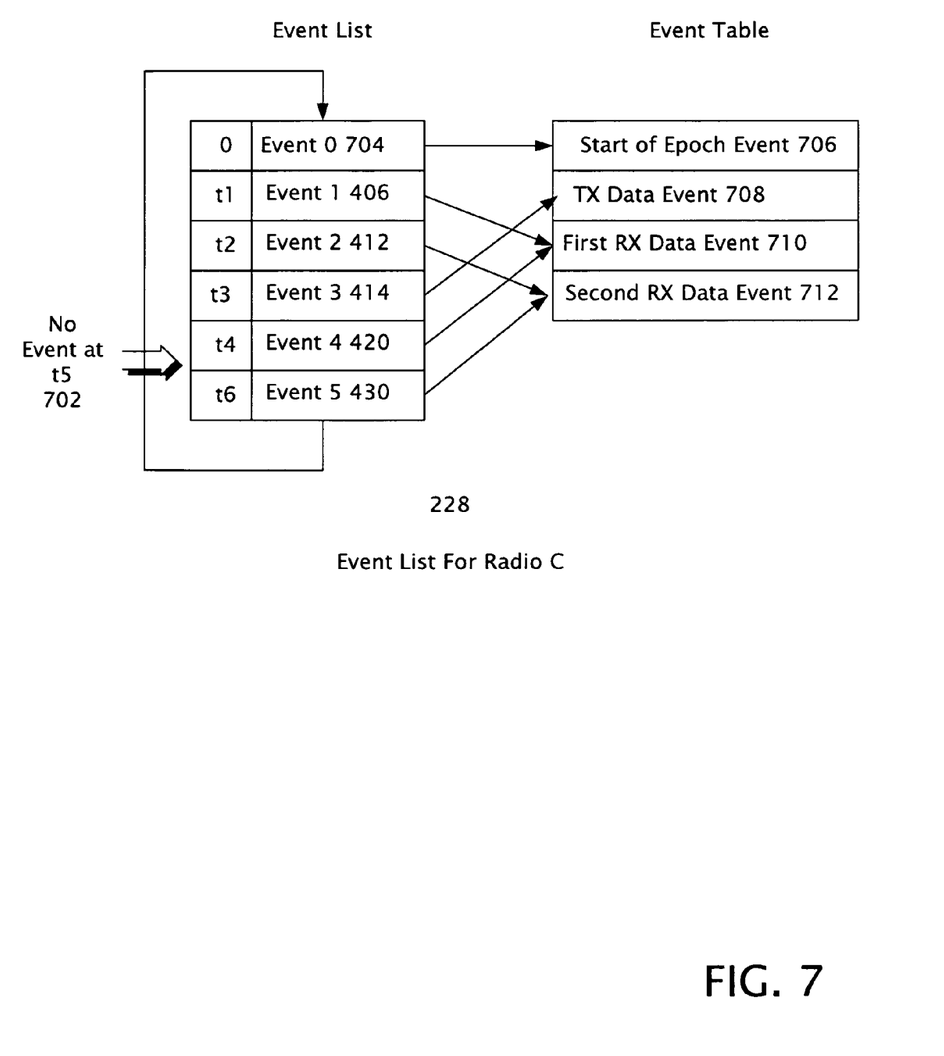
FIG. 7 illustrates the event list for a third radio in the exemplary network.

FIGS. 5-7 illustrate the event lists for radios A, B and C, respectively, for the sample epoch illustrated in FIG. 2. Each radio is configured with the appropriate events and event list, and then all radios start their event lists at the same time. Once started the event list repeats at the epoch rate (which is also fully configurable.) Each radio executes the events in its event list at their scheduled times. For each event, one radio is transmitting and one or more radios are receiving.

FIG. 5 shows an event list provided for radio A (202 of FIG. 2). The event list provides an initiation event 512 at time marker t0. Next, a time marker t1, event 1 404 is provided (corresponding to transmission 1-TX of FIG. 4). At time t2, event 2 408 is provided (corresponding to reception 2-RX of FIG. 4). At time marker t3, no event is provided 502. At time t4 event 418 (corresponding to transmission 1-TX of FIG. 4). At time marker t5, event 424 is provided (corresponding to transmission 4-TX of FIG. 4). At time marker t6 event 5 428 is provided (corresponding to reception 2-RX of FIG. 4). After the event list is completed the event list is repeated as shown.

The event table provides instructions for configuring each of the events, for example, the event 0512 is configured by the start of the epoch event 504. First TX data event 506 is used by events 404 at time t1 and events 3 at time t4. The second TX data event 508 is used by the time t4 event t3, and the time t5 event 4. The RX data event 510 is used by the time t2 event 2 40: and also by time 6 event 5 428.

FIG. 6 shows the event list for radio B (204 of FIG. 2) and also includes at time t0 event 0 606. At time t2 event 1 or 410 (corresponding to transmission 2-TX of FIG. 4) is activated. At time t3, event 2 416 (corresponding to reception 3-RX of FIG. 4) is activated. At time t5, event 3 422 (corresponding to reception 4-RX of FIG. 4) is provided. And at time t6 event 4, 426 (corresponding to transmission 2-TX of FIG. 4) is executed. The entire cycle repeats as shown. Also, note there is no event at t1 602, nor at t4 604.

The event table used to configure the event list provides for a startup epoch event 608, TX data event 610, first RX data event 612 and a second data RX event 614. The event list similarly calls upon the event table to configure each event.

FIG. 7 shows the event list for a third radio (206 of FIG. 2) in the exemplary network. At time t0 event 0, 704 is executed. At time t1 event 1, 406 (corresponding to reception 1-RX of FIG. 4) is executed. At time t2 event 2, (corresponding to reception 2-RX of FIG. 4) is executed at time t3 event 3 414 (corresponding to transmission 3-TX of FIG. 4) is executed. At time t4 event 4, 420 (corresponding to reception 1-RX of FIG. 4) is executed and at time t5 702 there is no event scheduled, then at time t6 event 5, 430 is executed which corresponds to the 2-RX event.

The event table includes a start of epoch event 706 which may be used by event 0, a TX data event which may be used by event 3, a first RX data event 710 which may be used by event 1 and event 4 and finally a second RX data event 712 which may be used by event 2 and event 5.

To facilitate dynamic reconfiguration each radio actually has two event lists, one active and one inactive. The GPP can configure the inactive list while the active list is in use, and a mechanism is provided for switching from one list to another with no interruption in service. Next, details of the modem operation are provided.

The modem and GPP communicate by means of two streams, TX and RX. All data, control, and status messages are transferred in these streams. These streams are internal communication paths between the modem and the GPP with some buffering capacity, e.g. FIFO's. For the purposes of this description the directions of the interface are with respect to the overall radio, i.e. the TX stream is from the GPP to the modem and the RX stream is from the modem to the GPP.

The modem can exist in either of two states, idle or active. When the radio is not operational, the modem is in the idle state. When the radio is operational, the modem is in the active state. Modem configuration will next be described.

When idle, all messages transferred between the modem and the GPP are control and status messages; the modem will neither generate nor accept data messages. When it is desired to begin operation, the GPP configures the modem by transferring the necessary control messages, as described below, and then issuing a command telling the modem to go active.

When active, the modem will expect data traffic as defined below. The transmit path will include at least one extra message for synchronization. Additional control information may be used to update variable parameters or to command the modem to cease operation and return to the idle state. Once the modem has gone idle, it must be reconfigured before it can go active again. A pause and resume capability is also provided by a separate pair of commands.

Each data event in the event list has an associated data size. Each time a scheduled TX event is executed, the modem will extract the corresponding amount of data from the TX stream.

Conversely, each time an RX event is scheduled the modem will attempt to receive the corresponding expected amount of data and place it in the RX stream. The event table contains event definitions which are used to configure the modem for each event by setting frequency, modulation or the like. The event list schedules events from this table at specific times. The event table and the event list are typically configured by the GPP before use. A start of epoch event is used by the modem to detect when a new epoch is starting.

The modem is responsible for this detailed scheduling. The GPP must synchronize the modem, specify the epoch duration, define the set of events which may be used, specify the schedule of events which make up an epoch, and tell the modem when the first epoch begins. The GPP must supply the correct data for transmit events at some time prior to the time that event is executed, and must accept data from the receive events in a timely manner, but need not maintain exact synchronization with the epoch.

The GPP must place the TX data in the TX stream in the order corresponding to the sequence of events. This will often involve multiplexing data messages from multiple flows into the proper sequence. Conversely, the GPP must demultiplex the data from the RX stream into the proper flow streams All of this is set up dynamically, accommodating a very wide range of possible configurations, epoch durations, etc. And the interface is capable of modifying both the configuration in the modem and the data structures in the GPP dynamically without loss of data or other service interruption.

When idle, the modem interface is exchanging control and status messages on an unscheduled, demand basis. The GPP must configure the modem by specifying the epoch duration, synchronizing the modem, defining the events, specifying the event list, and specifying the start time. This is done via a set of control messages.

All participating nodes must share a common time base so scheduled events can be executed in proper synchronization. The precision of the local clocks and the timing allowances of the waveform typically determine the precision of the scheduling. Any local clock mechanism may be used in combination with some standard reference signal.

Figure 8:
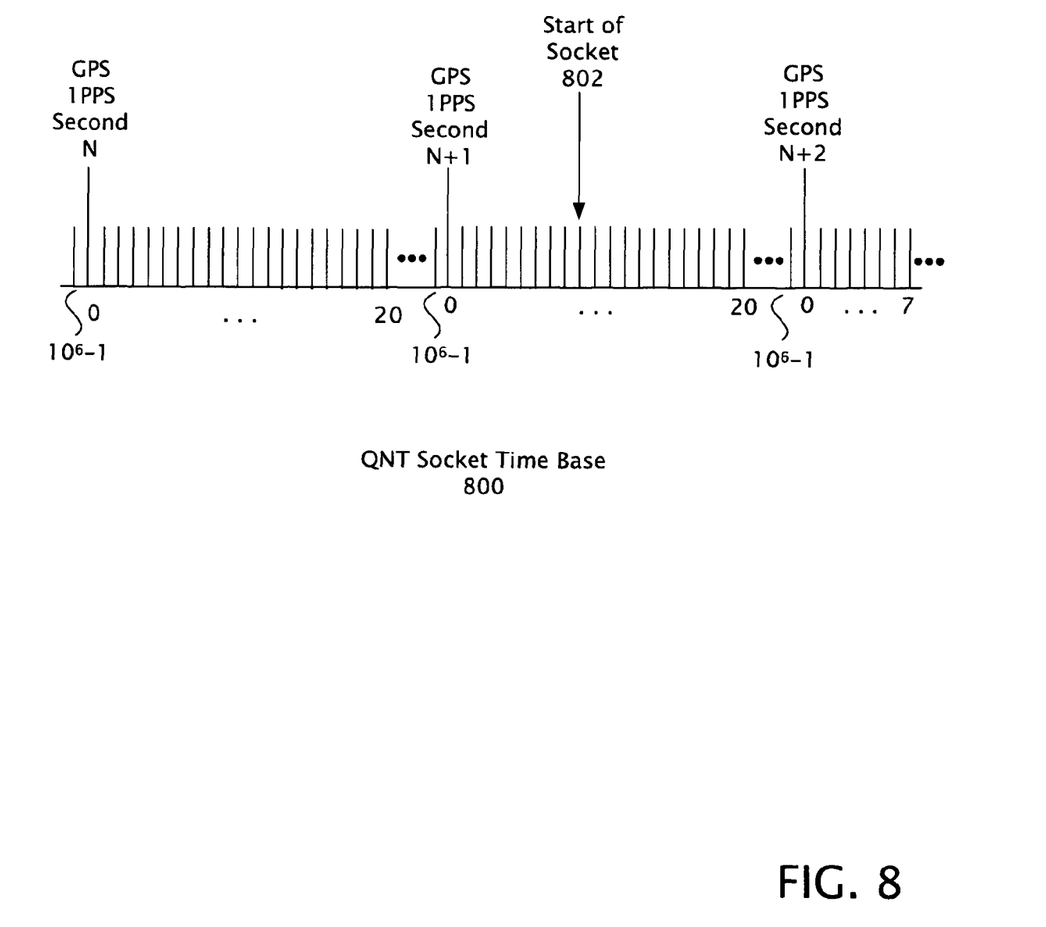
FIG. 8 shows an exemplary time base for synchronizing scheduled events for the radios on the network.

FIG. 8 shows a time base 800 using an exemplary 1 MHz clock for synchronizing scheduled events for the radios on the network. As an example, the QNT system may use a 1 MHz clock to interpolate between GPS 1 second pulses. In this case, the radios should be synchronized with respect to the 1 second pulses; the modem will interpolate between pulses using the 1 MHz clock. Participating exemplary QNT radios are expected to synchronize to the extent that the GPS pulses can be identified. The modem can be synchronized by means of a time sync message.

For QNT absolute time values may be represented by two 32 bit integers, the GPS pulse number and the offset. Given a 1 MHz clock the valid values for the offset are $0\text{-}10^6\text{-}1$. The start of operation, which is the start of the first epoch, is specified with an absolute time.

For example, the start of operation is specified to occur at (N+1, 9) using a start message 802. The start message may be specified far enough in advance to make sure all participants have time to properly configure themselves prior to the specified time.

The duration of the epoch is specified in the same format using the epoch duration message. An epoch which has a duration of less than $10^6$ tics always has a GPS pulse number of 0, e.g. (0, x). After the time base typically has been configured, then the events as described in the following paragraphs may be described and executed.

Before starting operation the GPP sends one or more Event Definition messages, which define the allowed events. An event represents some action that the modem may take at some specified time within each epoch. Note that the time is not specified as part of the event definition, and in fact the same event may often be repeated multiple times within the epoch.

The following sections describe the currently defined types of events. It may develop that other useful event types could be defined. The main event types of interest are the data transfer events indicating that a specified quantity of data should be transmitted or received. Data events specify the values of all configurable parameters required to perform the transmission or reception, and their exact definitions must depend on the capabilities of the particular modem.

The modem enters these event definitions in an event table at an index specified in the message and referenced by this index when the events are scheduled. Next, the transmit data event, this received data event, the bi-directional event, and the start of epoch event are described.

The "Transmit Data Event" event definition contains all the parameters to send a unit of TX data. The definition can include the number of bytes of data to be transmitted, and any other parameters, such as default power level, coding rate, modulation, etc. which are configurable.

An event may be defined for each type of TX data event. A different event could be defined for each of the radio's TX flows, even when their parameters are otherwise identical. The advantage of this indirection may be that modifications to an event definition, e.g. default power level, can be automatically applied to all events associated with that particular event definition.

The modem extracts the specified amount of data from the TX stream, if present, and transmits it as specified by the event definition. If the data extracted from the stream is a special NULL data object, then data for this event was not supplied in time and an under run has occurred. The GPP provides either real data or a NULL data substitute for every scheduled TX event in order to maintain synchronization with the modem.

Supplied data has a header which includes an identifier of message type (DATA, NULL, or any one of several others) and contains the index in the event list of the event for which the data is intended. The modem may choose to compare this header value to the index of the event for which data was extracted as an error check, but is not required to do so. It is the responsibility of the GPP to supply the proper amounts of data in the proper sequence.

The "Receive Data Event" event definition contains all the parameters necessary to listen for and receive a unit of RX data. The event list contains an RX data event that selects an RX event description from the event table. The parameters in the selected event table entry are used to configure the modem for proper reception. Further, the RX event in the event list indicates onto which receive stream the received data should be placed. The modem looks for an expected amount of received RX data as specified by the event definition and places the specified amount of data in the RX stream. If the expected data is not received, the modem may insert a NULL data message in the RX stream to maintain synchronization with the GPP.

The modem can be expected to place the index of the RX event in the event list in the header of the data for use by the GPP in confirming synchronization.

A bidirectional event may be capable of either transmitting or receiving, depending on circumstances. It operates in conjunction with a loopback function in the modem to perform either loopback operation or provide a receive by default/send on demand function to support demand based transmissions, e.g. push to talk.

When set in loopback mode, the modem usually expects data in the TX stream for this event, and the data is looped back to the RX stream, so that both RX and TX data transfers will correspond to this event.

When not set in loopback mode, the operation can depend on the presence of data in the TX stream. If actual data is present it is transmitted, no reception occurs, and a NULL data placeholder is placed in the RX stream. When the message in the TX stream corresponding to this event is a NULL data message, no transmission occurs and the modem operates in the same way as for a receive data event.

The "Start of Epoch Event" is the first event of every epoch and signifies that the modem should place a status message in the RX stream, and should extract a start of epoch message from the TX stream. Failure to extract a start of epoch message indicates a loss of synchronization.

To produce an event list from the previously described events, the GPP sends one or more event list messages. This message contains the number of events in the event list and one or more event entries. Each entry specifies a time at which an event is to be executed and the index in the event table of the event to be executed. Note that all events cited in the event list must have already been defined, but not all defined events need be referenced by the event list. The index in the table is self explanatory.

The relative event time is the time relative to start of epoch. Note that all event times within an epoch are relative to the start of the epoch.

To facilitate real time changes to the event list, two event lists are provided in the modem. All messages which manipulate the event list must specify which event list is to be used. It is the responsibility of the GPP to keep track of which event list is in use and which can or should be modified. An Event List Switch message is provided which the GPP uses to command the modem to switch the active and inactive event lists at a specified time.

The Event List Switch message also contains the index into the new active event list at which the modem should begin execution. This allows a switch which does not involve a change in epoch duration to be executed on only the radios affected while maintaining synchronization with the epoch. If this value is zero, however, the modem begins at the start of the new epoch. The latter case allows the duration of the epoch to be changed in real time and requires synchronization amongst all participating radios.

Once the event lists are populated and set into operation, they may be monitored to minimize or reduce transmission errors. Overall operation of the radio system involves multiple flows of data between multiple endpoints. The modem is transmitting and receiving single streams of data, with the various flows multiplexed and demultiplexed by the GPP. The GPP must supply data messages in the correct sequence to correspond to the events scheduled in the modem. Misalignment of data may cause data to be delivered to incorrect destinations and cause the flows to be scrambled. Since events will often involve different data sizes it may even cause the modem to fail. For these reasons it is critically important to maintain synchronization between the GPP and the modem, and to have mechanisms to detect and recover from a loss of synchronization.

Synchronization is maintained by requiring that data be transferred for all events, whether real data is ready for transfer or not. If the GPP has no data available for transmission at the scheduled time it must instead send a NULL data message to the modem. When the modem extracts a NULL data message for a transmit event nothing is actually transmitted but synchronization is maintained. Similarly, if the modem executes a receive event and no data is actually received, it must place a NULL data message in the receive stream. If data is received but is invalid for some reason, e.g. CRC error, it must either place an error message in the receive stream which indicates that an erroneous packet was received, or a NULL data message. In all cases each data stream must contain one data unit corresponding to each scheduled event in that direction.

Figure 9:
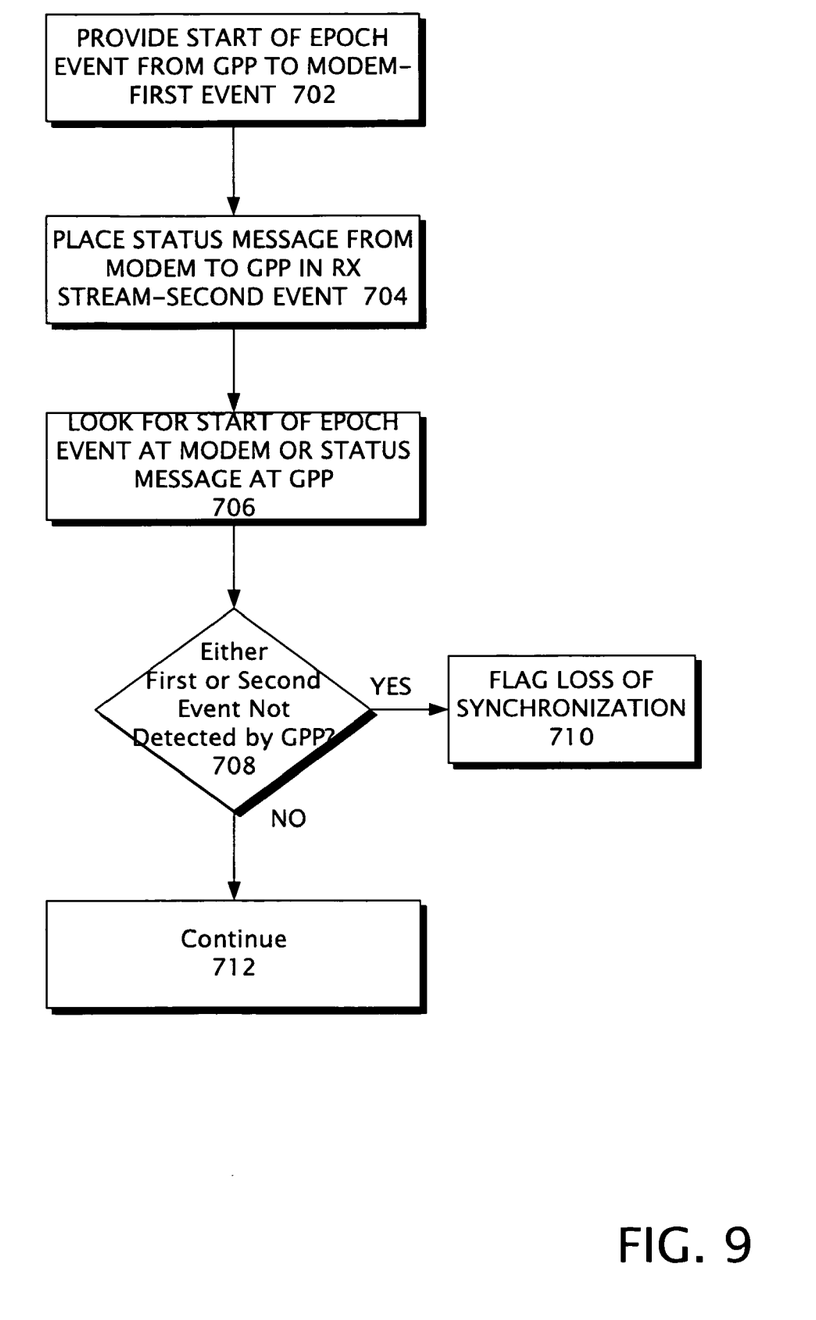
FIG. 9 is a flow diagram of a process for monitoring synchronization.

FIG. 9 is a flow diagram of a first process for monitoring synchronization at reception by the GPP. Synchronization is monitored by having a special start of epoch event 902. When the modem starts execution of the epoch the first event in the event list is the start of epoch event. When this event is executed the GPP will expect the next data extracted from the TX stream to be a start of epoch message. Also at this time the modem will place a status message in the RX stream 904. If either of these messages are not found by the GPP 706 when expected this indicates a loss of synchronization 708. This provides a check at least once per epoch that the modem and GPP are properly synchronized.

Figure 10:
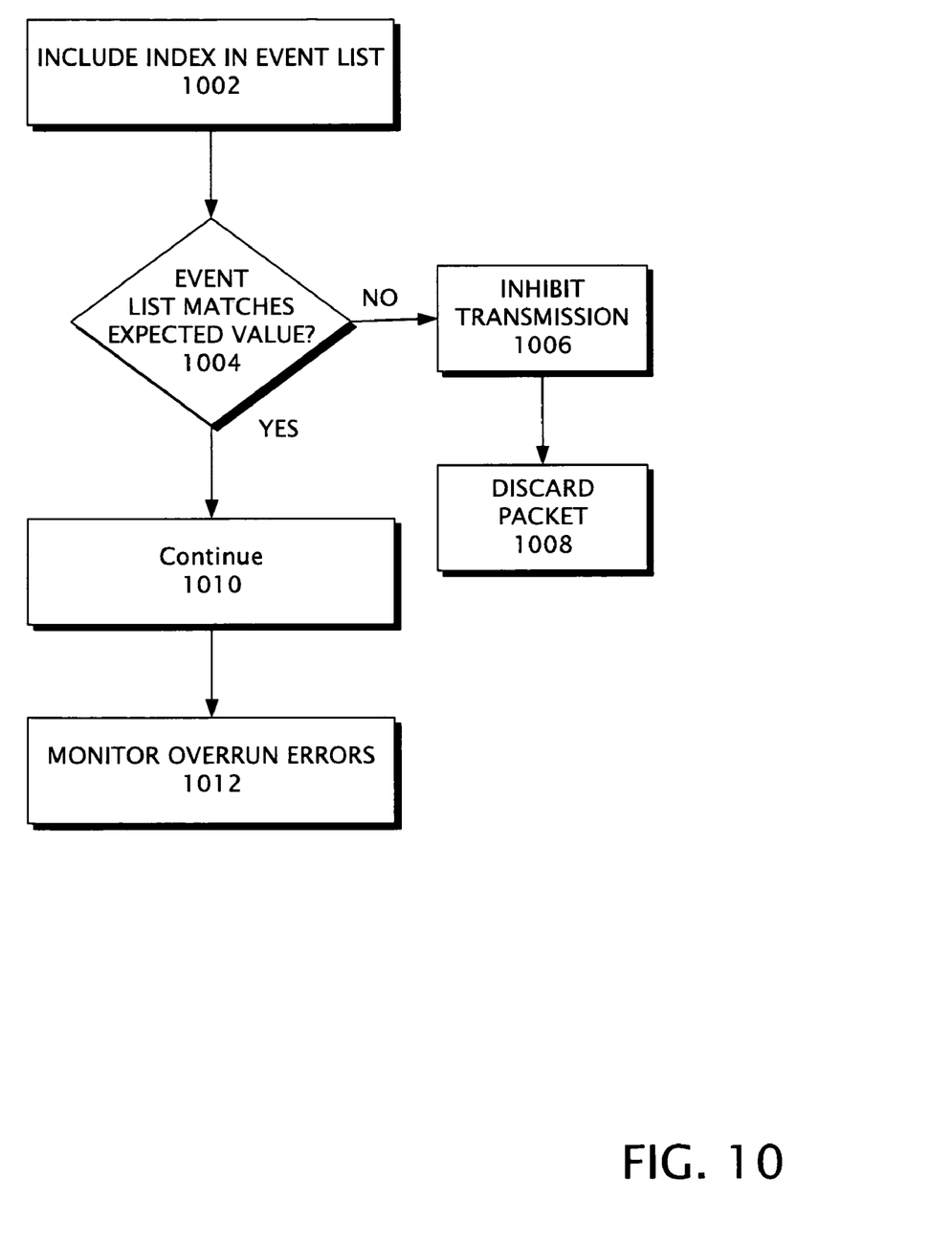
FIG. 10 is a flow diagram for an alternative method of monitoring synchronization.

FIG. 10 is a flow diagram for second process of monitoring synchronization by the modem. A more immediate check by the modem is possible by including the index in the event list 1002 of the event associated with each data message in its header. This index may be compared to the expected value 1004 to detect synchronization loss immediately. If the modem detects such an error it does not execute the transmission 1006, thus preventing transmission of data to incorrect destinations. Similarly, the modem reacts to this condition by discarding the received packet 1008, thus not corrupting its demultiplexed flows with unrelated data. For radio TX, the modem may detect a sync error if a next data buffer retrieved at the start of an epoch does not contain a start of epoch message. If the event list matches the process continues 1010.

A synchronization error may be detected by either the GPP or the modem. If the modem detects a synchronization failure it halts operation and notifies the GPP via the start of epoch status message or a specially defined error message. When the GPP detects a synchronization error or is notified by the modem, it sends a resync message to the modem. The modem responds by going inactive, if it hasn't already done so, clearing the interface data streams, and resetting its internal state. The modem sends a resync ready to the GPP when it is ready to resume operations. The GPP must restart its DMA operations and command the modem to resume operation.

Overrun errors 1012 occur when data is sent faster than it can be received. This is only possible on reception events when the RX stream cannot accept received data. This will result in a synchronization error and indicates failure of the GPP to service the RX stream at an adequate rate.

Two kinds of under runs must be distinguished. Hard under runs occur when the transmitter executes a transmit event but there is no data available on the TX stream, or when the receiver executes a receive event and does not put data in the RX stream. Either of these are error conditions and would be manifested as synchronization errors. Another kind of under run occurs when the transmitter executes a transmit event and the corresponding data is a NULL data message, or the receiver executes a receive event but receives no data and places a NULL data message on the RX stream. This kind of under run does not cause an error and may be a normal occurrence for some kinds of flows, e.g. transmit on demand or push to talk.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A TDMA radio system comprising:
a plurality of radios, each radio of the plurality of radios includes a general purpose processor (GPP) in communication with a programmable modem via a transmit (TX) stream and a receive (RX) stream, the TX stream provides a communication path from the GPP to the programmable modem, and the RX stream provides a communication path from the programmable modem to the GPP;
a plurality of event fists, each event fist of the plurality of event fists is associated with a radio of the plurality of radios, the event fist associated with each particular radio provides a fist of predefined events scheduled for the particular radio, each event of the fist of predefined events scheduled for the particular radio specifies predefined transmission parameters for the programmable modem of the particular radio, the predefined transmission parameters specified in each event include a transmission mode, a frequency channel and a data size; and
a common time base, the common time base is applied to each radio of the plurality of radios for establishing synchronization among the plurality of radios, the common time base indicates a start time agreed upon by the plurality of radios, and each particular radio of the plurality of radios operates according to the event fist associated with the particular radio starting at the start time;
wherein for each particular radio, when the particular radio is scheduled to execute a transmit event, the programmable modem of the particular radio is configured to extract data from the TX stream of the particular radio and transmit the extracted data on the specified frequency channel, where the amount of data extracted from the TX stream is based on the data size specified in the predefined transmission parameters of the transmit event; and when the particular radio is scheduled to execute a receive event, the programmable modem of the particular radio is configured to receive data on the specified frequency channel and place the received data on the RX stream of the particular radio, where the amount of data placed on the RX stream is based on the data size specified in the predefined transmission parameters of the receive event.

2. The TDMA radio system of claim 1 in which the plurality of radios transmit and receive in scheduled epochs, and the event list associated with each particular radio specifies predefined transmit and receive events scheduled for the particular radio during a given epoch.

3. The TDMA radio system of claim 2, in which the epochs may vary in time length.

4. The TDMA radio system of claim 1, wherein the predefined transmission parameters specified in each event further include a data rate and modulation information.

5. The TDMA radio system of claim 4, in which the predefined events are schedulable at any given time instances on the common time base, and scheduling of the predefined events is not constrained by time slot boundaries.

6. The TDMA radio system of claim 1 in which the event list includes events that have been previously downloaded to the plurality of radios.

7. The TDMA radio system of claim 6 in which the event list is configured by selecting events locally by the GPP.

8. The TDMA radio system of claim 1 in which the event list for each particular radio is downloaded to the particular radio before the start time.

9. The TDMA radio system of claim 1 in which one of the plurality of radios is a configurable radio, the event list associated with the configurable radio includes two event lists, the configurable radio utilizes one of the two event lists at a time, and the unutilized event list is dynamically reconfigurable.

10. The TDMA radio system of claim 1, wherein
when the particular radio is scheduled to execute the transmit event and the amount of data available on the TX stream is less than the data size specified in the predefined transmission parameters, the GP P of the particular radio is configured to provide a NULL data substitute to the TX stream to satisfy the specified data size in order to maintain synchronization of the common time base; and when the particular radio is scheduled to execute the receive event and the amount of data received by the programmable modem of the particular radio is less than the data size specified in the predefined transmission parameters, the programmable modem is configured to provide a NULL data substitute to the RX stream to satisfy the specified data size in order to maintain synchronization of the common time base.

11. A method of controlling a TDMA radio system comprising:
downloading an event list to a radio of a plurality of radios, the event list downloaded to each particular radio specifies a list of predefined events scheduled for the particular radio, each event of the list of predefined events scheduled for the particular radio specifies predefined transmission parameters for a programmable modem of the particular radio, the predefined transmission parameters specified in each event include a transmission mode, a frequency channel and a data size;

agreeing on a start time among the plurality of radios; and
setting scheduled transmissions in motion starting at the start time, wherein each particular radio is configured to operate according to the event list downloaded to the particular radio;

wherein for each particular radio, the programmable modem of the particular radio is configured to transmit data on the specified frequency channel when the particular radio is scheduled to execute a transmit event, the amount of data transmitted on the specified frequency channel is based on the data size specified in the predefined transmission parameters of the transmit event; and the programmable modem of the particular radio is configured to receive data on the specified frequency channel when the particular radio is scheduled to execute a receive event, the amount of data expected to be received is based on the data size specified in the predefined transmission parameters of the receive event.

12. The method of controlling a TDMA radio system of claim 11, further comprising repeating the events list at an epoch rate.

13. The method of controlling a TDMA radio system of claim 12, in which the epoch rate is not fixed.

14. The method of controlling a TDMA radio system of claim 12, in which the events within the epoch are of a variable duration and are scheduled at an arbitrary time, and the event list associated with each particular radio specifies predefined transmit and receive events scheduled for the particular radio during a given epoch.

15. The method of controlling a TDMA radio system of claim 11 in which setting scheduled transmissions in motion comprises:
controlling the programmable modem located on each radio of the plurality of radios by a repeating events list, each repeating events list being a program of radio transmissions and receptions; and
synchronizing transmissions with a set of DMA structures.

16. The method of controlling a TDMA radio system of claim 11 in which agreeing on a start time is provided by utilizing a common time base.

17. The method of controlling a TDMA radio system of claim 11, further comprising configuring an events list from an events table made up of a plurality of common events.

18. The method of controlling a TDMA radio system of claim 11, in which the events list begins with a start of epoch event.

19. The method of controlling a TDMA radio system of claim 11, further comprising:
providing a NULL message to the programmable modem of the particular radio when the particular radio is scheduled to execute the transmit event and the amount of data available for transmission is less than the data size specified in the predefined transmission parameters; and
providing a NULL message to the particular radio when the particular radio is scheduled to execute the receive event and the amount of data received by the programmable modem of the particular radio is less than the data size specified in the predefined transmission parameters.

20. A radio system comprising:
a time base means for providing a common time base to a plurality of radios, the common time base configured for establishing synchronization among the plurality of radios, the common time base including a start time agreed upon by the plurality of radios;
a radio means for providing TDMA radio signals, the radio means including a general purpose processor (GPP) in communication with a programmable modem via a transmit (TX) stream and a receive (RX) stream, the TX stream provides a communication path from the GPP to the programmable modem, and the RX stream provides a communication path from the programmable modem to the GPP;

a time management and control for a TDMA radio means for scheduling an event list for each radio of the plurality of radios, each event list specifying a list of predefined events to be executed by a particular radio starting at the start time, each event of the predefined events being schedulable at any given time instance on the common time base, each event of the predefined events being configured for specifying transmission parameters for the particular radio to execute the event via the radio means, the transmission parameters specified for each event include a transmission mode, a frequency channel and a transmission data size wherein for each particular radio, when the particular radio is scheduled to execute a transmit event, the programmable modem of the particular radio is configured to extract data from the TX stream of the particular radio and transmit the extracted data on the specified frequency channel, where the amount of data extracted from the TX stream is based on the data size specified in the predefined transmission parameters of the transmit event; and when the particular radio is scheduled to execute a receive event, the programmable modem of the particular radio is configured to receive data on the specified frequency channel and place the received data on the RX stream of the particular radio, where the amount of data placed on the RX stream is based on the data size specified in the predefined transmission parameters of the receive event.

* * * * *